United States Patent [19]

Bourland

[11] Patent Number: 4,530,965
[45] Date of Patent: Jul. 23, 1985

[54] POLYMERIC MOLDING COMPOSITION CONTAINING STYRENIC COPOLYMER, POLYCARBONATE AND MBS POLYMER

[75] Inventor: Larry G. Bourland, Downingtown, Pa.

[73] Assignee: Atlantic Richfield Company, Los Angeles, Calif.

[21] Appl. No.: 578,941

[22] Filed: Feb. 10, 1984

[51] Int. Cl.³ .............................................. C08L 69/00
[52] U.S. Cl. ...................................... 525/67; 525/71; 525/74; 525/902
[58] Field of Search ...................... 525/67, 74, 71, 902

[56] References Cited

U.S. PATENT DOCUMENTS 3,880,783  4/1975  Serini et al. ............................ 525/67
4,218,544  8/1980  Henton .................................. 525/67

*Primary Examiner*—Jacob Ziegler
*Attorney, Agent, or Firm*—Dennis M. Kozak

[57] ABSTRACT

A polymeric molding composition containing a polycarbonate resin, a styrenic copolymer and a methylmethacrylate-butadiene-styrene polymer is disclosed. The molding compositions of this invention exhibit excellent impact strength and can be molded over a wide range of processing conditions.

13 Claims, No Drawings

POLYMERIC MOLDING COMPOSITION CONTAINING STYRENIC COPOLYMER, POLYCARBONATE AND MBS POLYMER

This invention relates to plastics having excellent impact resistance.

In one of its more specific aspects, this invention pertains to a polymeric molding composition which contains a polycarbonate resin, a copolymer of an $\alpha,\beta$ unsaturated cyclic anhydride and a vinyl aromatic monomer, and a methylmethacrylate-butadiene-styrene polymer.

Various polymeric compositions or "polyblends" containing nonequimolar copolymers or styrene and maleic anhydride are known. For example, U.S. Pat. No. 3,862,998 teaches a polymeric composition of styrene/maleic anhydride and polycarbonate. U.S. Pat. Nos. 3,862,998; 4,351,920; and U.S. Ser. No. 379,700 now U.S. Pat. No. 4,469,843, all teach polymeric compositions of impact modified styrene/maleic anhydride copolymers and polycarbonate. The above prior art compositions are deficient in that they are shear sensitive and, accordingly, less than optimum molding conditions deleteriously affect the strength properties of the molded compositions. U.S. Pat. No. 4,388,443 teaches a polymeric composition of a rubber modified styrene/maleic anhydride copolymer, a polycarbonate resin and a polylactone. However, the incorporation of the polylactone, while serving to enhance toughness, deleteriously affects the heat properties of molded articles produced therefrom.

It has now been found that the incorporation of a methylmethacrylate-butadiene-styrene (MBS) polymer (hereinafter defined) into a composition containing a polycarbonate resin and a copolymer of an $\alpha,\beta$ unsaturated cyclic anhydride and a vinyl aromatic monomer, facilitates the production of molded articles over a wide range of molding conditions without deleteriously affecting the strength and/or heat properties of the molded articles.

According to this invention, there is provided a polymeric molding composition which comprises a blend of (A) a polycarbonate resin, (B) a copolymer of a vinyl aromatic monomer and an $\alpha,\beta$ unsaturated cyclic anhydride; and, (C) an MBS polymer.

In one embodiment, the polymeric molding composition contains an impact modified copolymer of a vinyl aromatic monomer and an $\alpha,\beta$ unsaturated cyclic anhydride.

The polymeric molding composition of this invention will be comprised, preferably, of a blend of 100 parts by weight of (A) from about 20 to about 95% by weight of a polycarbonate resin; (B) from about 5 to about 80% by weight of a copolymer of recurring units of a vinyl aromatic monomer and recurring units of an $\alpha,\beta$ unsaturated cyclic anhydride, wherein the percentages of (A) and (B) are based on the total combined weight of (A) plus (B); and, (C) from about 1 to about 15 total parts by weight MBS polymer per each 100 parts of combined (A) plus (B).

Preferably, (B) is the copolymer resulting from the polymerization of: (B.1.) from about 83 to about 96% by weight of vinyl aromatic monomer, and (B.2.) from about 4 to about 17% by weight of $\alpha,\beta$ unsaturated cyclic anhydride wherein the percentages of (B.1.) and (B.2.) are based on the total combined weight of (B.1.) plus (B.2.).

Optionally, the polymerization of (B.1.) and (B.2.) is carried out in the presence of from about 5 to about 30 total parts by weight of a first impact modifier (hereinafter defined) per each 100 parts of combined (B.1.) plus (B.2.).

Optionally, the polymerization of (B.1.) and (B.2.) is carried out in the presence of from about 2 to about 25 total parts by weight of a second impact modifier (hereinafter defined) per each 100 parts of combined (B.1.) plus (B.2.).

Polycarbonate resins suitable to produce the polymeric compositions of this invention are homopolycarbonates based on bisphenols having the following general formula:

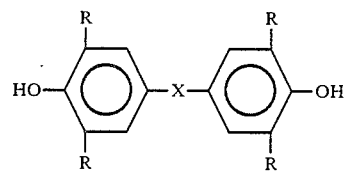

wherein each R separately represents hydrogen, a $C_1$ to $C_4$ alkyl group, chlorine, or bromine and wherein X represents a direct bond $C_1$ to $C_8$ alkylene. Preferably, the polycarbonate resin will be employed in an amount within the range of from about 20 to about 95% by weight, most preferably from about 40 to about 75% by weight, based on the total combined weight of (A) polycarbonate resin plus (B) copolymer.

Polycarbonates having the above general formula include: 2,2-bis-(4-hydroxyphenyl)-propane; 2,2-bis-(3-chloro-4-hydroxyphenyl)-propane; 2,2-bis-(3,5-dimethyl-4-hydroxyphenyl)propane; 2,4-bis-(3,5-dimethyl-4-hydroxylphenyl)-2-methylbutane. Particularly suitable for use in the practice of this invention is 2,2-bis-(4-hydroxyphenyl)-propane.

As used herein, the term "MBS polymers" is understood to mean a core-shell copolymer prepared in two or more stages in which said core is about 90 to 50 parts by weight of polybutadiene or a copolymer of butadiene with up to 50 percent, of at least one monomer selected from the group consisting of styrene, lower alkyl methacrylates, lower alkyl acrylates, acrylonitrile and olefins, and in which said shell is about 10 to 50 parts of a lower alkyl methacrylate with up to 50 percent of at least one monomer selected from the group consisting of styrene, acrylonitrile, and lower alkyl acrylates, with optional crosslinking and/or graftlinking monomers. The MBS polymer can also have the relationship of the core to to the shell reversed.

Methods for the production of MBS polymers are known. For example see the teachings of Example I of U.S. Pat. No. 3,985,704 which are incorporated herein by reference thereto.

Particularly suitable MBS polymers for use in the practice of this invention are designated: Metablen ® C Series Impact Modifiers (C-202, C-201, C-102C and C-223) commercially available from M&T Chemicals Inc., Durastrength ®200 Impact Modifier also available from M&T Chemicals Inc.; Acryloid ® KM Series Impact Modifiers (KM 581, KM 653, KM 436 and KM 680) available from Rohm & Haas Chemical Company; and, Kane Ace ® (B-22 and B-56) available from Kaneka America.

MBS polymer will be employed in the polymeric compositions of this invention in an amount within the range of from about 1 to about 15 total parts by weight, preferably 3 to 10 total parts by weight, per 100 parts of combined (A) polycarbonate resin plus (B) copolymer. Mixtures of MBS polymers can be employed.

Suitable $\alpha,\beta$ unsaturated cyclic anhydrides for use to produce the copolymers of the polymeric composition of this invention are represented by the following general formula:

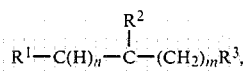

wherein the dotted lines represent a single or a double carbon to carbon bond; $R^1$ and $R^2$ taken together represents a

linkage; $R^3$ is selected from the group consisting of hydrogen, vinyl, alkyl, alkenyl, alkylcarboxylic or alkenylcarboxylic of from 1 to 12 carbon atoms, n is 1 or 2, depending on the position of the carbon-carbon double bond, and m is an integer from 0 to 10.

Particularly suitable $\alpha,\beta$-unsaturated cyclic anhydrides include maleic anhydride, citraconic anhydride, itaconic anhydride, aconitic anhydride, and the like, and their mixtures. Maleic anhydride is preferred.

Any suitable vinyl aromatic monomer which will copolymerize with the $\alpha,\beta$ unsaturated cyclic anhydride can be employed. Particularly suitable vinyl aromatic monomers are the styrenics which include styrene, alpha-methyl styrene, nuclear methyl styrenes, ethyl styrene, isopropyl styrene, t-butyl styrene, bromostyrenes, chlorostyrenes, vinyl naphthalene, and the like, and their mixtures. The preferred vinyl aromatic monomer is styrene.

Preferably, the copolymer will comprise from about 83 to about 96% by weight of recurring units of vinyl aromatic monomer and from about 4 to 17% by weight recurring units of $\alpha,\beta$ unsaturated cyclic anhydride monomer.

Although optional, if high impact strength is preferred, the copolymer can be polymerized in the presence of at least one impact modifier. Most preferably in the presence of a first and a second impact modifier.

As the "first impact modifier" use can be made of any conjugated diene/styrenic copolymer containing 65% by weight or more butadiene and/or isoprene. The balance of the copolymer will be recurring units of a styrenic monomer as described in the preceding paragraph. Homopolymers of butadiene and isoprene are also suitable for use.

Suitable first impact modifiers are the stereo specific copolymers of butadiene and styrene polymerized in a solution system using an alkyllithium catalyst. And, the copolymer rubbers designated Stereon® Rubbers, have been found to be particularly suitable for use; they are commercially available from Firestone Synthetic Rubber & Latex Company, Division of Firestone Tire & Rubber Company.

Stereon® Rubbers Nos. 700, 702, 720, 750 and 751 are all suitable for use and contain, respectively, 20, 20, 10, 18 and 25 weight percent bound styrene.

The first impact modifier, if employed, will be employed in an amount within the range of from about 5 to about 30 total parts by weight per each 100 parts of (B) copolymer.

As the "second impact modifier" use can be made of any vinyl aromatic monomer/conjugated diene copolymer, containing from about 10 to about 60% by weight conjugated diene. Preferably, the copolymer will contain from about 10 to about 35% by weight conjugated diene. The balance of the copolymer will be recurring units of a vinyl aromatic monomer, as previously described.

Particularly suitable vinyl aromatic monomer/conjugated diene copolymers are those designated K-Resin™ BDS Polymrs (KR01, KR05 and KR03) commercially available from Phillips Chemical Company, a Division of Phillips Petroleum Company.

K-Resin™ BDS Polymer is a mixed radial and linear teleblock copolymer containing about 75% by weight styrene and about 25% by weight butadiene.

The second impact modifier, if employed, will be employed in an amount within the range of from about 2 to about 25 total parts by weight per each 100 parts of (B) copolymer.

Any conventional method for the preparation of nonequimolar copolymers of vinyl aromatic compounds and unsaturated cyclic anhydrides can be employed to produce the copolymers of this invention.

For example, the copolymers can be produced by dissolving the $\alpha,\beta$ unsaturated cyclic anhydride, the first and the second impact modifiers (if employed) in the vinyl aromatic monomer. The mixture is then fed, continuously, into a reactor where polymerization is initiated using a conventional free radical initiator such as, for example, a peroxide initiator, a thermal initiator or mixtures thereof. The resulting polymer solution is continuously removed from the reactor and devolatilized to remove unreacted monomer.

The molding compositions of the invention can also include other ingredients, such as flame retardants, extenders, processing aids, pigments, stabilizers and the like, for their conventionally employed purposes. Reinforcing fillers, in amounts sufficient to impart reinforcement, can be used, such as aluminum, iron or nickel, and the like, and non-metals, such as carbon filaments, silicates, such as acicular calcium silicate, asbestos, titanium dioxide, potassium titanate and titanate whiskers, glass flakes and fibers.

The molding compositions may be prepared using any suitable method of blending. Preferably, the compositions are prepared by melt mixing at a temperature above the softing points of the polymers using any conventional high shear melt mixing apparatus, including twin screw extruders, single screw extruders, equipped with high shear mixing sections, and the like. Thereafter, the extrudate is chopped into pellets and molded on conventional injection molding equipment.

The present invention is further illustrated by the following examples, which are not to be construed as limiting.

EXAMPLE I (Control)

This example demonstrates the preparation of a polymeric molding composition which does not incorporate an MBS polymer.

A melt blend of 30 parts by weight of Merlon® polycarbonate and 70 parts by weight Dylark®250 styrenic copolymer was prepared by melt mixing on an extruder at a temperature of about 500° F.

Merlon ® polycarbonate (2,2 bis-(4-hydroxyphenyl)-propane) is commercially available from Mobay Chemical Corporation.

Dylark ®250 styrenic copolymer is an impact modified styrene/maleic anhydride copolymer which is prepared by polymerizing about 92% by weight styrene monomer and about 8% by weight maleic anhydride, in the presence of about 18 parts by weight Stereon ® Rubber 720 per 100 parts of combined styrene and maleic anhydride.

EXAMPLE II

This example demonstrates the preparation of a polymeric molding composition of this invention.

Using substantially the procedure and materials of Example I, a polymeric composition was prepared which contained: (A) 30 parts by weight polycarbonate, (B) 70 parts by weight impact modified styrene/maleic anhydride copolymer, and (C) 11 parts by weight of an MBS polymer designated Acryloid ® KM 581 (Rohm & Haas Company) per 100 parts by weight of combined polycarbonate and styrene copolymer. The MBS polymer was incorporated during melt mixing.

The polymeric molding compositions of Examples 1 and 2 were injection molded through gates into $2'' \times 3\frac{1}{2} \times \frac{1}{8}''$ thick molded samples using a Battenfeld 2 oz. shot capacity molding machine and the samples were subjected to Gardner Falling Weight Impact testing. The molding conditions employed and the impact strengths of the molded samples are contained in following Table I.

TABLE I

| | Composition of | |
|---|---|---|
| Molding Condition | Example I (Control) | Example II (Invention) |
| Gate Dimensions | 1/16" × 1/2" | 1/16" × 1/2" |
| Molding Temperature[1], °F. | ~500 | ~500 |
| Shear Rate[2] sec$^{-1}$ | 950 | 950 |
| Gardner Impact Strength[3] | 52 | 140 |

@ 23° C. (inch-pounds)

[1]Barrel temperature settings on injection molding machine.
[2]Shear Rate at the walls = $\frac{6Q}{Wd^2}$, in which Q = volumetric flow rate through the gate = $\frac{(P)}{St}$ and P = part weight; S = specific gravity; t = injection time; W = gate width; and d = gate depth.
[3]1¼" diameter orifice; ½" diameter punch.

The data of Table I show that the incorporation of MBS polymer into a polymeric composition of polycarbonate and styrene/maleic anhydride copolymer serves to enhance molded product impact strength at identical molding conditions.

EXAMPLE III (Control)

This example demonstrates the preparation of a polymeric molding composition which does not incorporate an MBS polymer.

A melt blend of 55 parts by weight of Merlon ® polycarbonate and 45 parts by weight of Dylark ®700 styrenic copolymer was prepared by melt mixing on an extruder at a temperature of about 550° F.

Dylark ®700 styrenic copolymer is an impact modified styrene/maleic anhydride copolymer which is prepared by polymerizing about 92% by weight styrene monomer and about 8% by weight maleic anhydride, in the presence of two impact modifiers. One modifier is Stereon ® Rubber 720 and is present in an amount of about 20 parts by weight per 100 parts of combined styrene and maleic anhydride. The second modifier is K-resin ™ BDS (KR03) Polymer (described above) and is present in an amount of about 10 parts by weight per 100 parts of combined styrene and maleic anhydride.

EXAMPLE IV

This example demonstrates the preparation of a polymeric composition of this invention.

Using substantially the procedure and materials of Example III, a polymeric composition was prepared which contained: (A) 55 parts by weight polycarbonate, (B) 45 parts by weight impact modified styrene/maleic anhydride copolymer, and (C) 5 parts by weight of an MBS polymer designated Acryloid ® KM 653 (Rohm & Haas Company) per 100 parts by weight of combined polycarbonate and styrenic copolymer. The MBS polymer was incorporated during melt mixing.

The polymeric compositions of Examples III and IV were injection molded through gates into $2'' \times 8'' \times \frac{1}{8}''$ thick molded samples and the samples were subjected to Gardner Falling Weight Impact Testing. The molding conditions and the impact strengths of the molded samples are contained in following Table II.

TABLE II

| | Composition of | | | |
|---|---|---|---|---|
| Molding Condition | Example III (Control) | Example IV (Invention) | Example III (Control) | Example IV (Invention) |
| Gate Dimensions | 1.93" × .025" | 1.93" × .025" | 0.63" × 0.02" | 0.63" × 0.02" |
| Molding Temperature[1] °F. | ~550° | ~550° | ~550° | ~550° |
| Shear Rate[2], sec$^{-1}$ | 11,800 | 16,600 | 325,000 | 810,000 |
| Gardner Impact Strength[3] @ 23° C. (inch-pounds) | 200 | 480+ | 30 | 480+ |

[1, 2, 3,] see Table I

The data of Table II show that the incorporation of a MBS polymer into a polymeric molding composition containing a polycarbonate resin and a styrene/maleic anhydride copolymer serves to enhance molded product impact strength. Moreover, the data also show that a significant increase in the shear rate and thus the shear stress imparted to the MBS polymeric containing molding composition by changing molding conditions, did not have a deleterious effect on molded product impact strength. Quite surprisingly, the impact strength of the molded product increased significantly.

It will be evident from the foregoing that various modifications can be made to this invention. Such, however, are considered as being within the scope of the invention.

What is claimed is:

1. A polymeric molding composition which comprises a blend of (A) a polycarbonate resin, (B) a copolymer of (B.1) a vinyl aromatic monomer and (B.2) an α,β unsaturated cyclic anhydride; and, (C) a core-shell copolymer in which said core is about 90 to 50 parts by weight of polybutadiene or a copolymer of butadiene with up to 50 percent, of at least one monomer selected from the group consisting of styrene, lower alkyl methacrylates, lower alkyl acrylates, acrylonitrile and olefins, and in which said shell is about 10 to 50 parts of a lower alkyl methacrylate or a copolymer of a lower alkyl methacrylate with up to 50 percent of at least one monomer selected from the group consisting of styrene, acrylonitrile, and lower alkyl acrylates wherein the polymerization of the (B.1) and the (B.2) is carried out in the presence of a first and a second impact modifier, wherein the first impact modifier is a conjugated diene/styrenic copolymer containing 65% by weight or more butadiene, isoprene or a mixture thereof and the second impact modifier is a vinyl aromatic monomer/conjugated diene copolymer containing from about 10 to about 60% by weight conjugated diene.

2. The polymeric molding composition of claim 1 in which said core-shell copolymer is methylmethacrylate-butadiene-styrene.

3. The polymeric molding composition of claim 1 in which said copolymer of a vinyl aromatic monomer and an α,β unsaturated cyclic anhydride is an impact modified copolymer of a vinyl aromatic monomer and an unsaturated cyclic anhydride.

4. The polymeric molding composition of claim 1 comprising a blend of 100 parts by weight of (A) from about 20 to about 95% by weight of a polycarbonate resin; (B) from about 5 to about 80% by weight of a copolymer of recurring units of a vinyl aromatic monomer and recurring units of an α,β unsaturated cyclic anhydride, wherein the percentages of (A) and (B) are based on the total combined weight of (A) plus (B); and (C) from about 1 to about 15 total parts by weight of said core-shell copolymer per each 100 parts of combined (A) plus (B).

5. The polymeric molding composition of claim 1 in which said polycarbonate resin is a homopolycarbonate based on bisphenols having the following general formula:

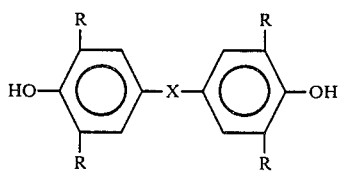

wherein each R separately represents hydrogen, a $C_1$ to $C_4$ alkyl group, chlorine, or bromine and wherein X represents a direct bond $C_1$ to $C_8$ alkylene.

6. The polymeric molding composition of claim 1 in which said polycarbonate is 2,2-bis-(4-hydroxyphenyl)-propane.

7. The polymeric molding composition of claim 1 in which said α,β unsaturated cyclic anhydride is represented by the following general formula:

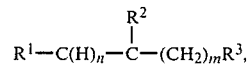

wherein the dotted lines represent a single or a double carbon to carbon bond; $R^1$ and $R^2$ taken together represents a

linkage, $R^3$ is selected from the group consisting of hydrogen, vinyl, alkyl, alkenyl, alkylcarboxylic or alkenylcarboxylic of from 1 to 12 carbon atoms, n is 1 or 2, depending on the position of the carbon-carbon double bond, and m is an integer from 0 to 10.

8. The polymeric molding composition of claim 1 in which said α,β unsaturated cyclic anhydride is maleic anhydride.

9. The polymeric molding composition of claim 1 in which said vinyl aromatic monomer is selected from the group consisting of at least one of styrene, alpha-methyl styrene, nuclear methyl styrenes, ethyl styrene, isopropyl styrene, t-butyl styrene, bromostyrenes, chlorostyrenes, and vinyl napthalene.

10. The polymeric molding composition of claim 1 in which (B) is the copolymer resulting from the polymerization of: (B.1.) from about 83 to about 96% by weight of vinyl aromatic monomer and, (B.2.) from about 4 to about 17% by weight α,β unsaturated cyclic anhydride, wherein the percentages of (B.1.) and (B.2.) are based on the total combined weight of (B.1.) plus (B.2.).

11. The polymeric molding composition of claim 1 in which first impact modifier is employed in an amount within the range of from about 5 to about 30 total parts by weight per each 100 parts of (B.1.) plus (B.2.).

12. The polymeric molding composition of claim 1 in which said second impact modifier is employed in an amount within the range of from about 2 to about 25 total parts by weight per each 100 parts of (B.1.) plus (B.2.).

13. The polymeric molding composition of claim 1 in which in said core-shell copolymer, said shell is a copolymer of a lower alkyl methacrylate with up to 50 percent of at least one monomer selected from the group consisting of styrene, acrylonitrile and lower alkyl acrylates with crosslinking monomer, or graftlinking monomers or mixture of the monomers.

* * * * *